March 24, 1970
R. L. PASTORIUS
3,502,313
STEEL PRODUCING PLANT WITH UMBILICALLY OPERATIVE FURNACE TOP MEANS
Filed May 3, 1966
2 Sheets-Sheet 1
Fig.1
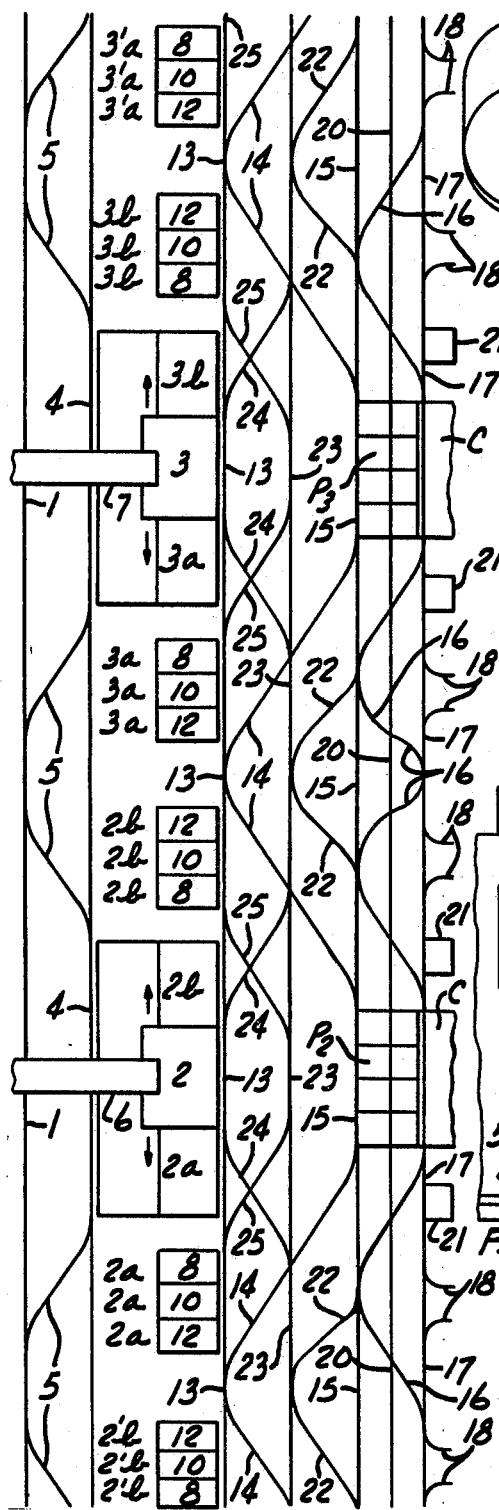
Fig.2
Fig.3
Fig.4
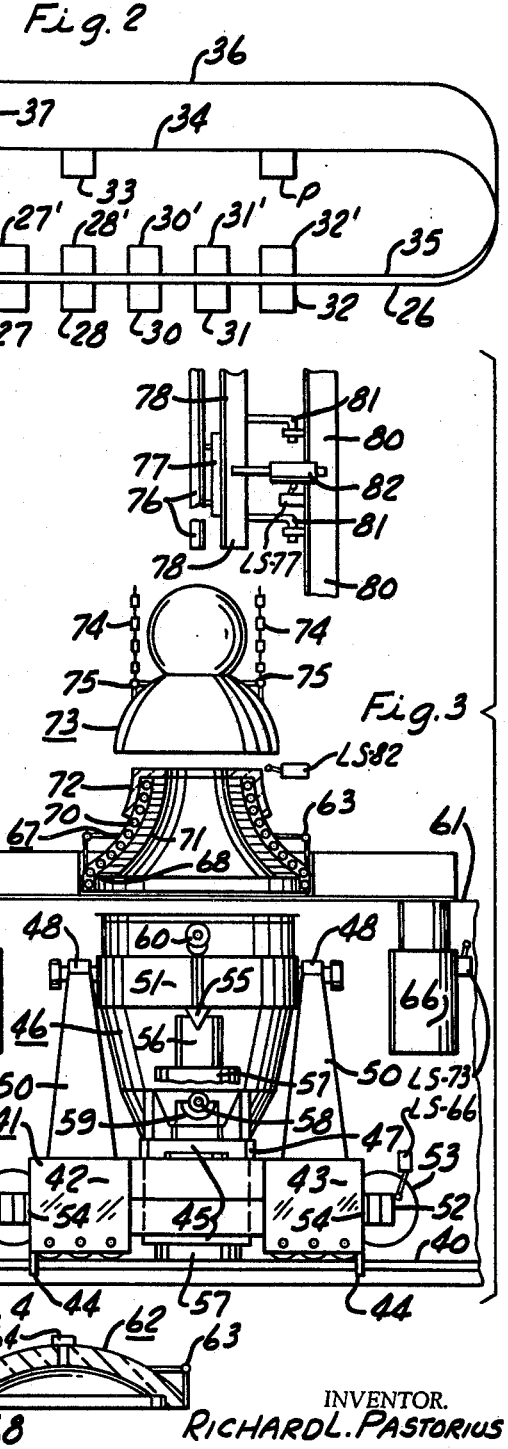
INVENTOR.
RICHARD L. PASTORIUS
BY
CAROTHERS & CAROTHERS
HIS ATTORNEYS

Fig. 5

United States Patent Office

3,502,313
Patented Mar. 24, 1970

3,502,313
STEEL PRODUCING PLANT WITH UMBILICALLY
OPERATIVE FURNACE TOP MEANS
Richard L. Pastorius, 2122 E. Carson St.,
Pittsburgh, Pa. 15203
Filed May 3, 1966, Ser. No. 547,263
Int. Cl. C21c 5/56
U.S. Cl. 266—13                                    13 Claims

ABSTRACT OF THE DISCLOSURE

A steel producing plant providing a consecutive series of stations for standby, loading, preheating, blowing, degassing, blocking, pouring, or discharge with a carriage supporting a refractory line steel producing vessel to move through the consecutive series of stations for the melting and refinement of steel. The carriage supported vessel is an upwardly open refractory line vessel with a shape similar to that of a ladle wherein the chamber expands from the bottom thereof upwardly to its largest diameter which continues to the mouth thereof and may be interiorly lined with brick or provided with an integral lining. The ordinary frustum top sections for these furnaces are provided at each of the stations requiring the preheating and blowing or possibly the degassing stations. This permits decentralization of the furnace proper and all the attending equipment necessary for the operation of a steel producing plant.

---

This invention relates generally to apparatus employed for the making of steel in the pneumatic method as applied to the basic oxygen furnace top blown process or the electric melt as applied to the electric melting furnace process.

In the present basic oxygen furnace steel making process and the electric furnace melting process, the tilting vessel is made large for high capacity and is mounted on stationary supports in the midst of a crowded supply, service and maintenance depot, such as raw material bins and conveyors; preheat and oxygen blowing lance station, with all piping, hoses and operating platform to service and maintain these lances; facilities to supply hot metal from the blast furnace to the basic oxygen furnaces; and a furnace reline tower that must be brought to and lowered into the furnace for maintenance. This crowded supply depot leaves little clearance and operating room for the above mentioned apparatus and services let alone the movable smoke hood that is placed above the furnace to carry off the combustion gases and the mechanism to support and operate the same. Then spaces must be provided at a lower level for the receiving ladle to receive the steel from the furnace.

When the furnace or any of its operating apparatus needs maintenance, the furnace is non-operating.

When the furnace needs relining the entire depot is idle and the reline tower is lowered therein for this purpose.

Thus, work is continually carried on under the handicap of the crowded area around the furnace, during its operation as well as during its repair or replacement. To compensate for the down time it is necessary to have two or more furnace placements to maintain production.

Since all steel making processes as above mentioned have stationary locations necessitating the transport action of all charging materials and all maintenance equipment with the materials needed for this service together with the controls for operation as well as service equipment, it is a principal object of this invention to transport the basic oxygen or electric melting furnace to various stations of production as well as maintenance. In place of bringing all maintenance services and production materials to one crowded and concentrated point of a stationary mounted furnace, the objective is to not concentrate all these services to one station but to separate each service to one independent station in the proper sequence in the process of making steel of this type. This requires the transportation of the furnace to the various stations. Each station serving in accordance with its own service. First, is the charging station with all the necessary materials.

These materials are top loaded one-by-one into the furnace. Next, is the pre-heating station wherein the top truncated portion of the furnace is lowered into position for the pre-heat operation. When this is completed the top truncated portion of the furnace is raised and the remainder of the furnace is transported to the oxygen blowing station or electric melting station (whichever process is being used). Here another truncated top portion of the furnace is lowered onto the bottom portion of the furnace, the smoke hood placed in position, the oxygen blowing lance inserted into the furnace through the top of the furnace and the oxygen blowing of the furnace charge starts and continues for the allotted time. After the allotted blowing time the truncated top portion of the furnace is raised and then the bottom portion of the furnace is transported to the degassing station or it can be transported directly to the pouring station. After the pouring operation, it is transported to the cleanout station. If repairs are needed the furnace is side tracked to the reconditioning station or if repairs are not needed, the furnace is retained in line for another production run. From this service the production for this type steel can be increased at least two and one half times from the present rate or production using practically the same production facilities as a two placement stationary mounted furnace service with the exception that more mobile furnace vessel units will be required.

Thus, the principal object of this invention is the provision of a method requiring the mobilization of the vessel to cooperate with a series of stations such as loading, pre-heating by natural or other gas, blowing with oxygen gas, blocking for sampling and inserting additives, reblowing if necessary, pouring and teeming. Heavy load high production vessels or smaller and lower production vessels may be employed and an adequate number of vessels are always in condition and in readiness for the making of steel by either of the processes mentioned above.

The stations may be multiplied in accordance with the production need. A set of such stations are preferably arranged in a series. The mobile furnace vessels are readily moved and locked in position at each or any desired station for the preferred progression, requiring each of the stations to operate on a consecutive series or selected stations are required for use to make the steel desired. Thus, the mobility of the furnace vessel in combination with a duplicate or a triplicate series of stations merely multiples the capacity of making steel and at a materially faster rate or at a selected controlled rate. The principal advantage resides in the fact that the station equipment for loading and blowing and other desirable stations, may always be continuously used without interruption. With three or more sets of stations processing and pouring may be made substantially continuous.

There is no down time for a furnace because another mobile furnace vessel may take its place in production. The mobile vessel needing relined or repairs merely circulates to a repair depot out of the way of the other depots. It makes no difference how much time it takes for the vessel to cool or be repaired as long as there are a sufficient number of mobile vessels for the plant. These are important objects of the present invention.

Another object of this invention resides in the provision of apparatus including a mobile vessel. This may be a wheel supported carriage for rails or for an endless tractor carriage on a preformed concrete and/or steel plate roadway. The carriage in either case is preferably self propelled with remote operated electronic or radio controls to operate the same and provide with interlocks to prevent the mis-operation of any one part of the process. The mobile vessel is provided with an approach reduced speed control for each depot and the centering device is preferable a stationary hydraulic blocking mechanism effective on the carriage and the vessel which when initiated by the approach of the carriage shuts down its locomotion and extends the blocking wedges to properly lock the position of the carriage. At the same time, hydraulic supports extend to engage the vessel and assume the load independently of the carriage.

Since teeming is not performed at the loading station, the pre-heating or blowing stations, there is adequate time to take a sample for selecting the proper ingredients for teeming before the vessel is required to be poured.

The vessel supporting mechanism may raise and tilt the vessel independently of the carriage. The carriage also carries a hoist mechanism to position the vessel on a trunnion rack.

In place of self-propelled carriages, the vessels may be chain conveyed and pushed or pulled in either direction by automatic locking devices.

The rail track is preferably of the ladder switch type with two or more parallel travel tracks interconnected by switch overs in opposite directions interconnecting the parallel travel tracks to provide complete mobility to any one or a series of stations. The parallel travel tracks interconnect as many independent units and ancillaries as the plant may require. Since the blowing time of approximately twenty-two minutes is somewhat longer or shorter than some loading time cycles, it is preferable to have a loading station for each blowing station. Pre-heating stations may be in line with the blowing and loading stations but they may not be used on all occasions.

The track, whether rail carriages or tractor carriages, is preferably of reinforced concrete with surface tread that is readily maintained and the mobility of the vessel depends upon the capability of switching around any section of track for repairs or replacement.

The hook or chain or cable system should operate through a slot or a tunnel in or alongside the path of travel.

The second most important object to that of a mobile vessel is the character of the vessel itself. To practice the process another look at the vessels demonstrates that they are all built for unit installations. They carry on each step at one location. The vessel is only made mobile to replace it and the two speed car is provided with hoists for the bottom lifting jack and the shell lifting jack. This is referred to as a complete unit.

The novel vessel comprising this invention has no permanent cone top. The cone top is a part of the preheating and blowing station or the re-blowing station after additives are inserted if necessary. The vessel is an upwardly open crucible and preferably has a continuously expanding chamber from the spherical shaped bottom, which may be considered as a claim definition to this novel vessel. It may be provided with a low side tap when no trunnions are used, or with high side taps with trunnions. This allows for quick and more readily replaceable linings. It permits integral cost linings. U.S. Patent 2,741,555 shows such a vessel in a diagrammatic illustration but does not mention anything about its structure or the removability of the so-called cover 4.

By providing a removable cone the weight of the vessel is reduced which solves many problems. This permits change in balance, the use of a water cooled cone as well as a water cooled hood to catch the gases, the independent maintenance of the frustum furnace top section and the election of the use of elevators or other means to reline the vessel.

Thus, the top or frustum section of the furnace becomes an independent structure at each necessary station. It is operated, raised and lowered, by an independent hydraulic system. It is shiftable laterally for changing. It is preferably provided with an upper inner surface of refractory to cooperate with the hood which is also independently operated as in the present day systems.

Since these is no loading or teeming at the blowing station there is considerably more room to properly handle the furnace top, the hood and the scrubler and stock mechanisms connected therewith.

The lance may be pivotally swung on the opposite side from the hood since teeming is done elsewhere. The vessel becomes in effect a ladle after the steel is properly made and may then pass to a second holding station to determine if the additives properly reacted.

The holding stations are like the pre-heating or blowing stations but they are not equipped for the low blowing period of twenty-two minutes. At these stations a modified cover is provided.

The teeming or pouring may be at one or several locations. A continuous casting system may be supplied directly from the convertor vessel, with special accommodations for the slag. The vessel may be low side poured or high side tilted with the appropriate mechanism. The vessel may be tapped or tilted to pour into ladles in the usual manner but at a different station than the blowing.

The travel time from any one station should take less time than any station dwell period. This will allow the vessel at any one station of loading, pre-heating, blowing, degassing, and pouring to progress to the next proceeding station in half the time of any station dwell period or approximately eleven minutes. If multiple units are utilized and the pouring operation can be accomplished in an eleven minute period, then a unit can be positioned at each of the primary stations, mainly, preheat, blowing, and degassing to produce the process of making steel by the above mentioned processes in a continuous uninterrupted casting operation. Thus, by segregating the functions into different stations with flexible locomotion for the mobilized vessels, many of the present problems of unit shutdown may be solved.

Another object is the provision of mobilization of the furnaces through independent operating stations to maintain substantially continuous operation of each station at intervals less than the maximum time of the operation at any one station.

Another object is the provision of mobilization of the vessel processing steel by the reaction process to accurately gauge the production of the mill within minutes. This may be accomplished with a selection of the foregoing objects by providing vessels of various capacities or utilizing various capacity loads or changes in the same capacity vessel. The smaller sized vessels with their calculable load provide good efficiency in time reduction and are better than smaller loads in larger vessels. Again, the capacity may be regulated by the interspersing of the smaller and larger sized vessels to tailor-make the steel needed or to fluctuate the capacity as required by the mill.

The process of this invention provides flexibility in the production without sacrificing shutdown time of very expensive equipment. This flexibility is based upon mobility of selective sizes of reduction vessels through the progressive reduction steps which are carried on in separate stations for loading, pre-heating, blowing, inserting additives, final reaction, and discharging in producing steel. This in combination with the flexibility of switching these mobile vessels to include or exclude selective stations and the ability to change and repair or relieve vessels during periods when other vessels take their place in a repair depot or station provides continuous flexible production.

If the self-propelled or pulled carriage car or endless track support needs repair at the same time as its vessel, they are readily separated for independent work or for loading on another vessel to take the place of the vessel being relined.

The open top vessel may be provided with a cover when moving between stations if neded.

The relining and repair may be remote of the process stations as well as the vessel standby station. The latter permits all the standby mobile vessels to either take their turn in the process or merely await for replacement of those in service.

Another object of the present invention is the provision of locking means at each station to position or align and lock the mobile vessel at each station while the process there is being carried on. This locking means is preferably in the form of cushioned stops which extend from the wall to grip the mobile vessel at both ends. However, an electronic method may also be employed wherein a photo cell beam is used to trip a locking mechanism.

A more specific object is to provide the mobile vessel of the present invention with a tilting jack on its carriage to tilt the vessel when desired.

Other objects and advantages appear hereinafter in the following description and claims and in the accompanying drawings.

The accompanying drawings show for the purpose of exemplification without limiting the invention and claims thereto certain practical embodiments illustrating the principles of this invention wherein:

FIG. 1 is a diagrammatic view showing a plant layout for making steel by the oxygen reaction process and having a lineal path and arrangement for six blowing stations which illustrates the method of producing steel using a mobile vessel.

FIG. 2 is a diagrammatic view showing a plant layout for making steel by the oxygen reaction process and having a circular path for only one blowing station to illustrate the method of producing steel using a mobile vessel.

FIG. 3 is a diagrammatic view illustrating a mobile vessel with stops and supports for each station and in particular the removable furnace top or frustum and hood with the air or oxygen nozzle for operation at the preheating and the blowing stations.

FIG. 4 is a diagrammatic view illustrating the section of a blowing lid or top for the vessel to block or hold the heat therein.

FIG. 5 is a diagrammatic detailed view illustrating a single series of stations for loading, pre-heating, blowing, degassing and pouring, all of which are in a single line.

Referring to FIG. 1 of the drawings the supply track 1 is a through track for the freight cars to enter the plant for carrying supplies for the loading depots, stations 2 and 3, which are serviced from the loading track 4. Switch-over tracks 5 are placed periodically to enable the cars being unloaded to stand on the unloading track 4 while other stations may be supplied with other supply cars. The conveyors 6 and 7 carry the ore and other raw materials to the loading stations 2 and 3 from the raw material yard to the left of the through supply track 1. The conveyors 6 and 7 may provide the whole of the supply and they may come from a single point in the yard. Again the conveyors 6 and 7 may supplement the rail supply. Thus, the crossovers 5 provide adequate movability for fast transportation of materials handled by car such as burnt lime, dolomitic lime, pellets scale, flurospar, limestone or scrap. Thus, the facilities are made very flexible to supply these mobilized steelmaking vessels.

Each of the loading stations are made in pairs 2a, 2b and 3a, 3b, one for each of the furnace positions or stations 2 and 3 on the opposite side of tre loading station.

Each part of each loading station has its respective bins to contain each of the foregoing supplies as well as other supplies not mentioned that are necessarily additives to make a specific character of steel such as found in the publication, The Making Shaping and Treating of Steel.

The furnace station positions are preferably three in number but the method may well be practiced with only one furnace position as well as two positions.

With three furnace stations, the first position 8 is for pre-heating the vessel after having been loaded with the proper proportions of raw and prepared materials including scrap and molten iron or steel or both. At the pre-heating station, a furnace cone and lance are provided and a hood for receiving the gases of combustion. The lance will be provided with an oxygen laden gas such as oxygen air or oxygen enriched combustible gas. Each of the three furnace stations 8, 10 and 12 are similar because they require substantially the same structure to preform different stages in the heat treatment cycle. The station 8 is for pre-heating with air but could be quickly changed to oxygen by the mere operation of a valve to give the lance a selected source of oxygen laden gas.

Station 10 is normally the blowing station but if two vessels were loaded at the same time and moved respectively to staitons 10 and 8, they both could be blown at the same time to convert the iron into steel without a pre-heat. On the other hand the preferred proceduce would be to pre-heat with air at 8 and blow with oxygen at 10.

Station 12 is preferably set aside as the station where additives are inserted in the heat to produce a specific character of steel. These additives are inserted in the heat to produce a specific character of steel. These additives would be transported by conveyor to their respective loading station. If it is necessary to partially blow the heat with air or oxygen, this station is also provided with this equipment. All three of these stations 8, 10 and 12 could be the blowing station thus eliminating the first and last staiton functions and three mobile vessels would have to be loaded at one and the same time and blown at the same time. This would increase the production and the oxygen production should be such that it can serve three mobile vessels at one time but the adjacent banks of furnace positions should be operated alternately so the oxygen supply equipment could be functioning substantially all the time.

Station 12 may not only be used for correcting the melt by additives, but for the purpose of degassing the molten metal before pouring.

Thus, whether each of the three stations 8, 10, and 12 are used as pre-heating, blowing and degassing stations respectively, they may each simultaneously pre-heat, blow and degas independent mobile vessels.

The mobile vessels as shown in FIG. 3 travel along track 13 on which is located each of the stations, the material stations 2 and 3 and each of the stations 8, 10 and 12 therefor. Each of the latter stations are shown in FIG. 3. Although track 13 extends down the line through all the stations mentioned, the mobile vessels are positioned at each station for the time required to perform the functions at that station. Thus, the stations (a) 8, 10 and 12 would preferably function as all blowing stations and at the same time the mobile vessels from stations (b) 8, 10 and 12 would be moving and thus continue alternately. If stations (a) and (b) 8, 10 and 12 are used as pre-heat and blowing to refine at 8 and 10, then thereafter additives may be inserted after which there may be a short reblow followed by a degassing period at station 12. The station (a) and (b) will also be operating alternately to allow the cross travel of the finished vessels along the crossovers 14 to the pouring stations P2 and P3. There may be additional pouring stations beyond the ends of the line.

These pouring stations are along track 15 and if the vessels need repairing, they travel to the switchovers 16 to the repair line which may be a through line with off-sidings 18 for shop and storage. The vessel may be removed from the car and replaced by a new vessel while the other is being repaired. Thus, the cars if not needed for overhauling may stay in service.

The intermediate track 20 is the track on which other types of vessels may be filled to carry the steel elsewhere in the plant. The space over track 17 and therebeyond is for continuous pouring machines in the making of steel shapes by the continuous process. If hot steel is to be employed at the loading stations 2 and 3, a crane ladle conveys the hot metal to these stations across the tracks from the pouring stations. If molten pig iron is required, this hot metal is transferred at the pouring stations P2 and P3 into ladles and thus by crane carried over the tracks to the loading stations. Thus, the pouring stations are equipped to operate in both directions.

The mobile vessels having finished pouring and, not needing repairs, are dumped at the cleaning station on track 17 and thence by the crossovers 16 and 22 are placed in readiness on the distribution track 23 to traverse the crossovers 24 to the appropriate loading stations 2 or 3. The crossovers 24 are preferably used as the standby locations for the mobile vessels as this is the last position in which they may stop before being sent to the loading station.

One or more emergency crossovers 25 may be employed between the loading track 13 and the distribution track 23. These crossovers 25 will permit different loading stations to supply loaded mobile vessels to furnace positions 8, 10 and 12 associated with other loading stations not in use or not having the right ingredients for making the steel required.

In this manner, the parallel traveling paths are provided for the loading and furnace stations and for the pouring and cleaning and repair stations. This arrangement provides travel paths some of which are lineal and others parallel and which are interconnected by crossover travel paths that permit flexibility in the progressive movement of the mobile vessels in the process of making steel.

Referring now to FIG. 2, the travel paths are only three in number forming two ovals. The first travel path 26 has the loading or charging station 27 and the next four stations are actually furnace stations, the first being the pre-heating station 28, the second being the blowing station 30, the third is the blocking station 31 where additives are supplied to make the proper alloy and which is also equipped to blow or degas, and the fourth station 32 is principally for degassing. When the steel is finished the mobile vessel may be blocked by a closure and continued to the pouring station P on track 34. After pouring the hot metal, the mobile vessel travels to the cleanout station 33. The mobile vessels may be immediately started back through the steel making line passing through the same circuit and thus keep all parts of the mill continuously working. A duplicate line may be placed on the travel path 35, placing the second series of charging and furnace positions or stations respectively at 27', 28', 30', 31' and 32'.

If the vessels need repair their mobile cars are shunted to the repair track 36.

It is preferable to arrange the travel path through the process of making steel so that the raw materials and the other loading materials may come from one side of the track, otherwise service in taking materials to the loading lines has to be by overhead conveyors or traveling cranes or roadways all of which are indicated at 37 in FIG. 2.

Referring to FIG. 3, which represents any one of the furnace positions, and of which there may be three or even four depending upon the flexibility of the mill, the track or roadway is preferably grade level. This track or roadway as previously stated may be a concrete roadway with a metal surface such as indicated at 40 and which may be a pair of rails for a mobile car or carriage 41. The metal surface of track 40 will support an endless track mobile car or a mobile car having flanged wheels both of which are included but only the track rails and wheels are shown at opposite ends of the car 41. The middle wheels of each truck need not be flanged but the end wheels should. The locomotive is contained within the end bodies 42 and 43 which contain the trucks of the car. This locomotion is preferably electrical with an off side power rail (not shown) with the pickup shoes indicated at 44. The control is preferably by radio being entirely remote control.

The intermediate part of the truck supports the hoist 45 to hydraulically aid in lifting the vessel 46 and the platform 47 when the trunnion caps 48 are removed to permit the vessel to be exchanged for repairs. The trunnion caps are mounted on the trunnion supports 50 carried over the trucks at the ends of the car. The trunnions are supported by the trunnion ring 51. The car 41 is centered at each station by the fluid actuated centering bars 52 which are extended from the cylinders 53 to simultaneously engage a pad 54 on the ends of the car to accurately center the same at the station as shown. These bars address the car at an angle to insure engagement with the pads and any one of them will not move the car out of position but both will move it to the center and lock it in place. The cylinders 53 are interlocked in their control to make the extensions of the bars at the proper time and for the proper distance. This is further interlocked with the mobile control to prevent locomotion when the bars are extended.

Figure 5:
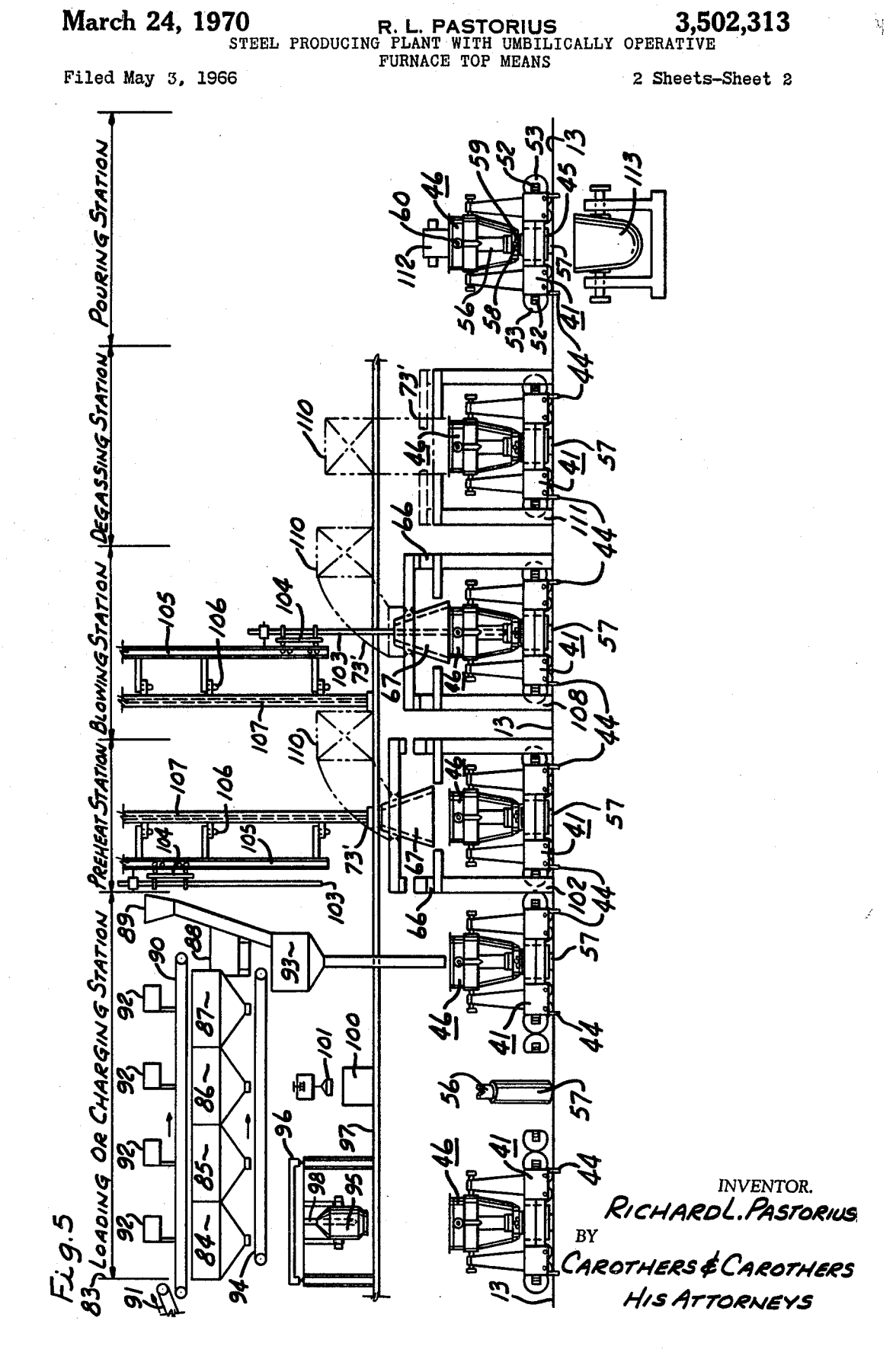

Below the trunnion ring 51 the vessel has independently positioned centering lugs 55 on each side of the vessel. These centering lugs are engaged by extensible fluid piston rods 56 which have a complementary face that interlocks with the block 55. These piston rods slope outwardly and downwardly toward the ground where they are received in their respective cylinders 57 mounted on the ground as shown in FIG. 5, the most of cylinder 57 which is broken away on the face exposed in FIG. 3, although the rear steady fluid cylinder 57 is indicated under the center of the car.

These steady fluid cylinders and pistons hold the upper portion of the vessel against the lateral movement when being loaded or during the violent turbulence within the vessel due to the reaction circulation.

The tap spout and gutter is indicated at 58 and 59 adjacent the bottom of the vessel. This tap spout connects to the very bottom of the curvature in the vessel chamber lining.

The tilting spout is shown at 60 above the trunnion ring 51. At the pouring station the complement to the rear stabilizing fluid piston 56 and cylinder 57 onto the lower end of the other side of the vessel to support, tilt and raise the same when the car is held by aligning bars 52. This takes the place of a crane hook which, of course, could be used. The fluid cylinder and piston provide a steady support in a fixed tilting path for the tilting of the vessel to pour from the spout 60.

The top of the working floor 61 is above the upwardly open vessel 46 and the interior may be clearly viewed as the mobile vessel travels from station to station unless it is provided with the blocking cap 62 shown in FIG. 4 which is ceramically lined and is raised and lowered by the annular hook ring 63. The arch of the blocking cap is provided with a removable plug 64. This blocking cap may or may not be used after blowing or degassing. It may be useful between the time of the making of the steel and the pouring.

The elevator platform 65 is preferably square in shape to properly position the fluid actuated hoist members at each corner. The platform has a bridge opening to support the furnace top 67 which is frustoconical and has an inner seat 68 to rest on top of and cover the edge of the furnace in the same manner as the blocking cover 62. This frustum or truncated cone when lowered by the elevator platform 65 actually closes the top of the furnace and its weight is divided between the furnace and the elevator.

The removable truncated top 67 leaves the vessel 46 entirely open for relining and repairs or even for ease in pre-casting the lining for insertion bodily into the steel shell of the vessel which is an important object and advantage of this invention.

The removable truncated cone also has a lift ring so that it may be readily replaced.

A water cooling circulatory system is placed on this truncated furnace top as indicated at 70. This retains the control of the temperature of the top during operation to prevent distruction of the inner lining as well as the outer lining at 71 and 72 respectively. The outer lining is encased by the bell 73 when lowered to collect the burning gases and to control the influx of air to support combustion if the gas is not being collected. It is preferable that the bell does not engage the outer refractory 72 but if it engages at all it will engage the truncated top below the refractory band 72.

The bell is raised and lowered by the chains 74 on the hoist ring 75.

The bell or back of the top hood 73 is in turn connected to the spray tower and may hence be connected to a vent stack or a spray chamber and scrubber.

When the truncated top 67 is lowered the elevator 65 has its top surface flush with the floor 61 as the pistons lower into the cylinders 66 and a portion of the weight of the truncated top rests on top of the normally upwardly open vessel. The bell or hood 73 is then lowered to the desired position on the outer surface of the cone to produce the venturic action is inducing the suction of air for aiding in the combustion of the gasses.

When all of these members are properly lowered or if the hood is not required, then the lance 76 is operated by the elevator 77 running vertically on the track 78 that is hingedly supported from the building column 80. The hinge arms are indicated at 81 and the operation to swing the lance into and out of position is performed by the fluid piston and cylinder indicated at 82.

Referring now to the series of stations shown in more detail in FIG. 5, each loading station here indicated at 83 is provided with a series of bins shown at 84, 85, 86 and 87 for receiving materials such as burnt lime, dolomite lime, pallet, scale, fluorspar and other similar materials required in the making of steel. The coke may be supplied by coke cars indicated at 88 and the limestone from the hopper 89.

The hoppers 84 to 87 are supplied by the conveyor 90 which in turn is fed by the conveyor 91. The conveyor 90 having movable ploughs or deflectors 92 or other means to cause the conveyor 90 to discharge its load at any one of these hoppers or to feed off the end of the conveyor 90 into the weight discharge hopper 93, that also received coke from the cars 88 and limestone from the hopper 89. The conveyors 91 and 90 may also be employed to convey coke or limestone directly to discharge hopper 93.

The conveyor 94 likewise carries the materials from the hoppers 84 to 87 directly to the discharge hopper 93. These materials are properly proportioned with reference to the hot pig iron, scrap and the character of steel desired. The hot metal such as pig iron may be supplied and proportioned by the ladle 95 carried by the crane 96 from the rear of the loading or operating dock or floor 97. This crane carries a fluid jack 98 or a tilting chain to tilt the ladle and pour the hot metal into the waiting furnace 46 on the carriage 41.

After receiving the hot metal the furnace 46 is moved to scrap station 100 which is picked up by the traveling magnet 101 and lowered into the furnace 46 when at this position.

As the furnace travels beneath the chute of the discharge hopper 93, all of the other materials required for making of this steel is discharged from this hopper 93 into the furnace 46 to complete the load.

When the furnace 46 is fully loaded it continues on to each of the pre-heating, blowing and degassing stations, if all of the stations shown are employed. Of course, only the blowing station need be employed to complete the heating process and the same station can be used for degassing. The pre-heating station 102 is provided with a lance 103 which may move vertically on the carriage 104 carried on the track 105 pivotally supported on the hinges 106, one part of which is secured to the columns 107. A similar arrangement is employed for the lance at the blowing station 108. At the pre-heating station a combustible gas is preferably employed or a mixture of a combustible gas and air or air heavily laden with oxygen under high pressure.

At the pre-heating station 102 and the blowing station 108, the upper or cone part of the furnace 67 is suspended from the hoist mechanism 66 and at station 102 the cone is raised to allow an exchange of furnace structures. In station 108, the cone part 67 is lowered as well as the lance 103 in operating position. The exhaust bell or canopy 73' is in position to withdraw the gasses from the reaction taking place within the furnace. These burning gasses are received in the gas discharge 110 which may pass to a stack or to scrubbers and other heat exchanges as previously described.

In station 111, the degassing station, the cone portion 67 of the furnace has been dispensed with and the water cooled hood 73' which is the same as that previously illustrated, is not moved to the side because the lance 103 has been removed from this station. The water cooled hood 73' is lowered over the whole of the furnace opening to withdraw the gases after blowing.

In the pouring position the furnace 46 with its pouring spout 60 may be tilted on its trunnion by a jack member 112 at this station. The hydraulic life 45 is retracted as shown to permit the jack 112 to tilt the furnace and pour from the spout 60 into the ladle 113 is preferably positioned to be lifted and carried by a crane.

If the furnace is too heavy to tilt, the tapping spout 58, may be blown and the trough 59 will convey the molten steel to ladle 113 after which a ladle similar to 113 is brought into position to receive any molten slag. The slag remaining in the furnace 46 is preferably removed or dumped out at a cleaning and refurbishing station.

As previously stated, the control of the steel processing from station to station is preferably entirely remote. One phase of the control is illustrated in FIG. 3 in the form of a sequence of operations controlled by limit switches LS–66, LS–73, LS–82, and LS–77. When the car 41 has come substantially to rest, the centering bars 52 are activated by a control means such as a photo-electric cell or limit switch and position and center car 41. Limit switch LS–66 is then activated by the extended bars 52. Limit switch LS–66 then in turn permits the cylinders 66 to become activated which lowers the frustum 67 in engagement with the vessel 46. When lowering is completed, limit switch LS–73 is automatically activated which then permits the hood 73 to be lower on its hoist chains 74 over the frustum 67. When this step is completed, limit switch LS–82 is tripped and thereby activates fluid piston and cylinder 82 which swings the lance 72 into position to be lowered into the hood 73 and frustum furnace top 67. When this positioning is completed, limit switch LS–77 is automatically switched on and thereby activates the lance carriage 77 to lower the lance 76.

The same sequence of operations may be done however with the omission of one of the steps if so desired. For example the controller may through a switch which will cause LS–73 to activate cylinder 82 instead of lowering hood 73. This would sequentially complete the above mentioned steps with the omission of the hood 73. This is desirable in the preheat station which may also be used as the blowing station.

Upon completion of the processing of the steel at the particular station, the sequence of operational control is then reversed by similar means.

I claim:

1. A steel producing plant with a plurality of propelled carriages each having a trunnion supported furnace selectively guided through a plurality of equipped stations such as for standby, loading, preheating, blowing, degassing, blocking, pouring and repair stations characterized by a refractory lined steel producing jacketed furnace in the form of an upwardly open vessel with a chamber that continuously expands from the bottom to its greatest dimension which terminates at the vessel rim, a refractory lining in said vessel chamber following the contour thereof and including the mouth of said rim to form a hot metal chamber, frusto-conical furnace top means umbilically operatively connected at selected of said stations to cooperate with the rim of said vessel, and means to raise and lower said furnace top means to mate and seal with said upwardly open vessel rim at selected of said stations.

2. The structure of claim 1 wherein said furnace top means is a steel jacket in the form of a frustum the chamber of which expands from an opening at the top of a greater dimension which terminates adjacent its bottom, a refractory lining in said frustum furnace top providing an annular seat adjacent its bottom to mate and seal with said mouth of said furnace vessel rim.

3. The structure of claim 2 characterized by a depending skirt on the bottom of said steel jacketed frustum to overlap said furnace jacket vessel down over the rim thereof to aid in sealing the same.

4. The structure of claim 2 characterized by a fluid cooling system attached to said furnace top jacketed frustum for regulating the temperature of said furnace top means.

5. The structure of claim 1 characterized by laterally projecting lock means to engage opposite portions on said carriage to align and lock said furnace vessel at each of said selected stations.

6. The structure of claim 5 characterized by an elevator platform means bridging the carriage path and supporting said furnace top means to move and operatively engage said furnace top means on said mouth of said vessel rim when the latter is locked at one of said selected stations.

7. The structure of claim 1 characterized by upwardly projecting base means to independently engage and laterally support said furnace vessel at selected of said stations such as loading, and blowing stations.

8. The structure of claim 1 characterized by power pivoting means on said mobile carriage for tilting said furnace vessel at selected of said stations to pour from the same.

9. The structure of claim 6 characterized by control means to automatically activate said elevator platform means to lower and seat said furnace top means in operative engagement relative to the mouth of said vessel rim.

10. The structure of claim 6 characterized by vent hood means supported above said furnace top means to exhaust the gasses therefrom, power actuated means for raising and lowering said vent hood means for cooperative action over said furnace top means, and control means to vary the open gap therebetween and commensurate with the production of the furnace.

11. The structure of claim 10 characterized by automatic control means to position said power activated vent hood when said furnace top means is moved to operative position with said furnace top means.

12. The structure of claim 6 characterized by operative oxygen type lance means at selected of said stations, and power means to automatically swing, raise and lower said operative lance means into said furnace top means to heat and refine the metal.

13. The structure of claim 12 characterized by control means to automatically activate said lance means when said furnace top means is inoperative position with said vessel rim mouth.

References Cited

UNITED STATES PATENTS

| | | | |
|---|---|---|---|
| 2,855,194 | 10/1958 | König | 266—35 |
| 3,149,191 | 9/1964 | McFeaters et al. | 266—35 X |
| 3,154,406 | 10/1964 | Allard | 266—35 X |
| 3,212,880 | 10/1965 | Rinesch | 266—34.2 X |
| 3,215,425 | 11/1965 | Vogt | 266—35 |
| 3,312,544 | 4/1967 | McCready et al. | 266—13 X |
| 3,358,983 | 12/1967 | Wegscheider et al. | 266—35 |
| 2,799,492 | 7/1957 | Höbenreich et al. | 266—13 |
| 3,013,789 | 12/1961 | Sayre et al. | 266—36 |
| 3,331,681 | 7/1967 | Mobley | 75—60 |
| 3,411,764 | 11/1968 | Falk et al. | 266—13 |
| 2,741,555 | 4/1956 | Cuscoleca et al. | 266—35 X |
| 3,312,544 | 4/1967 | McCready et al. | 266—35 X |

FOREIGN PATENTS 971,489   7/1950   France.

J. SPENCER OVERHOLSER, Primary Examiner

R. D. BALDWIN, Assistant Examiner

U.S. Cl. X.R.

266—36